United States Patent
Boland

(10) Patent No.: US 8,402,593 B2
(45) Date of Patent: Mar. 26, 2013

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1204 days.

(21) Appl. No.: 11/815,515

(22) PCT Filed: Jan. 13, 2006

(86) PCT No.: PCT/EP2006/050199
§ 371 (c)(1),
(2), (4) Date: Oct. 8, 2008

(87) PCT Pub. No.: WO2006/079591
PCT Pub. Date: Aug. 3, 2006

(65) Prior Publication Data
US 2009/0064440 A1  Mar. 12, 2009

(30) Foreign Application Priority Data
Jan. 25, 2005 (EP) .................................. 05100454

(51) Int. Cl.
*B60S 1/38* (2006.01)
(52) U.S. Cl. ........... 15/250.201; 15/250.43; 15/250.451; 15/250.454
(58) Field of Classification Search ............... 15/250.43, 15/250.44, 250.451–250.454, 250.361, 250.201
See application file for complete search history.

(56) References Cited

U.S. PATENT DOCUMENTS

| | | | | |
|---|---|---|---|---|
| 2,697,241 A * | 12/1954 | Oishei | ...................... | 15/250.452 |
| 3,035,298 A * | 5/1962 | Scinta | ...................... | 15/250.452 |
| 3,132,368 A * | 5/1964 | Reese | ...................... | 15/250.451 |
| 4,063,328 A * | 12/1977 | Arman | ...................... | 15/250.43 |
| 4,279,054 A * | 7/1981 | Hancou | ...................... | 15/250.452 |
| 5,970,569 A * | 10/1999 | Merkel et al. | ............... | 15/250.43 |
| 6,668,419 B1 | 12/2003 | Kotlarski | | |
| 6,675,434 B1 * | 1/2004 | Wilhelm et al. | ......... | 15/250.454 |
| 2001/0034921 A1 * | 11/2001 | Kang | ....................... | 15/250.452 |
| 2002/0148064 A1 * | 10/2002 | Dietrich et al. | ............. | 15/250.43 |
| 2004/0098821 A1 * | 5/2004 | Kraemer et al. | ......... | 15/250.201 |

FOREIGN PATENT DOCUMENTS

| | | |
|---|---|---|
| DE | 10259478 A1 | 7/2004 |
| DE | 202004012132 U1 | 11/2004 |
| EP | 1491416 A | 12/2004 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade (2) of a flexible material, which can be placed in abutment with a windscreen to be wiped, which wiper blade includes opposing longitudinal grooves on its longitudinal sides, in which grooves spaced-apart longitudinal strips (4) of the carrier element are disposed, wherein neighboring ends of said longitudinal strips are interconnected by a respective connecting piece (G), which windscreen wiper device comprises a connecting device (7) for an oscillating wiper arm (8), with the special feature that said wiper blade is detachably connected to said longitudinal strips, wherein said wiper blade can freely slide along said longitudinal strips between a first position, wherein said wiper blade is retained onto said longitudinal strips, and a second position, wherein said wiper blade is disconnected from said longitudinal strips in order to be replaced or repaired.

13 Claims, 5 Drawing Sheets

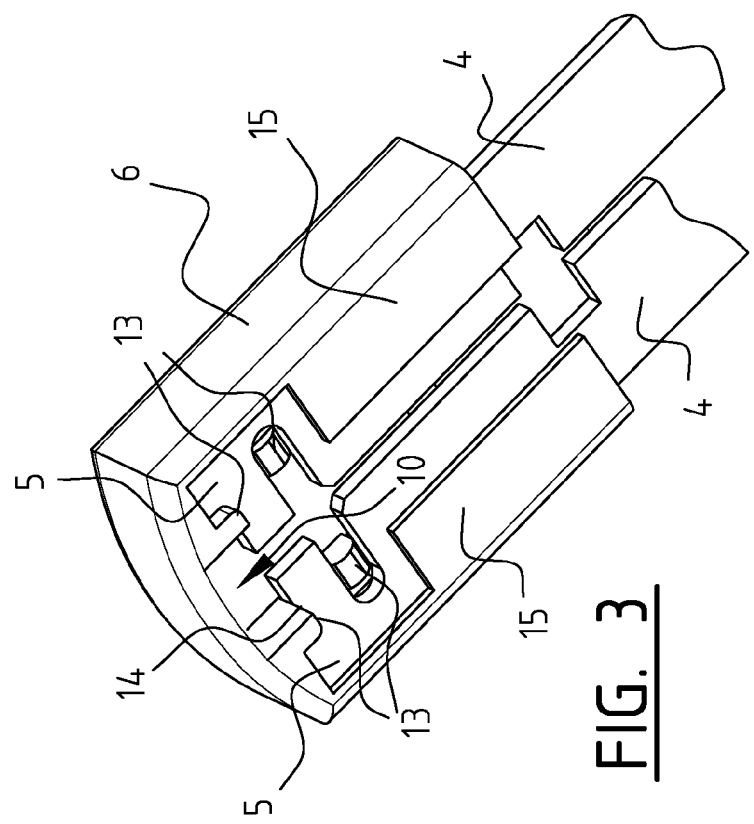
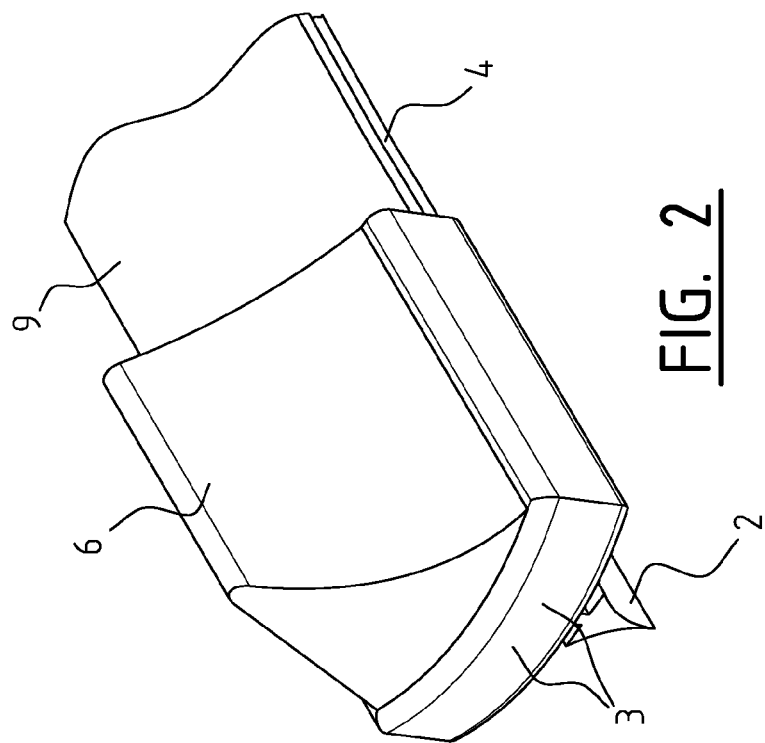

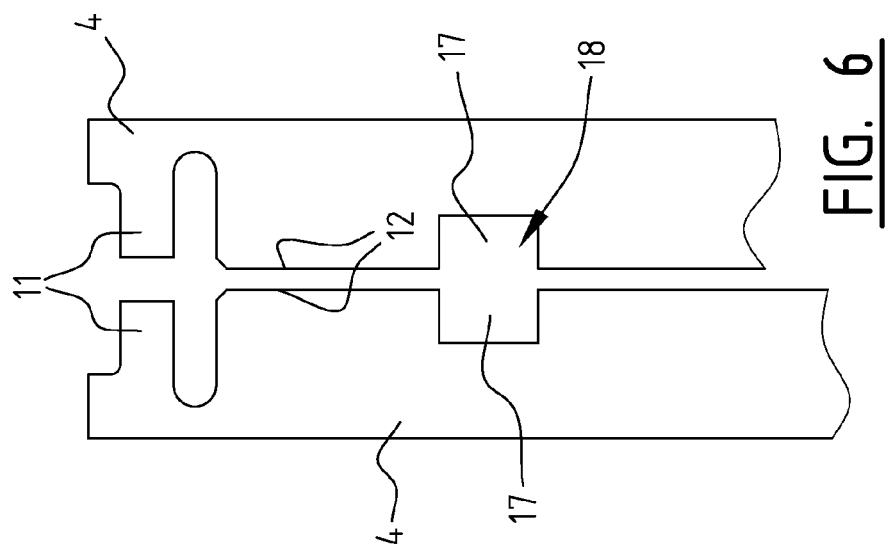
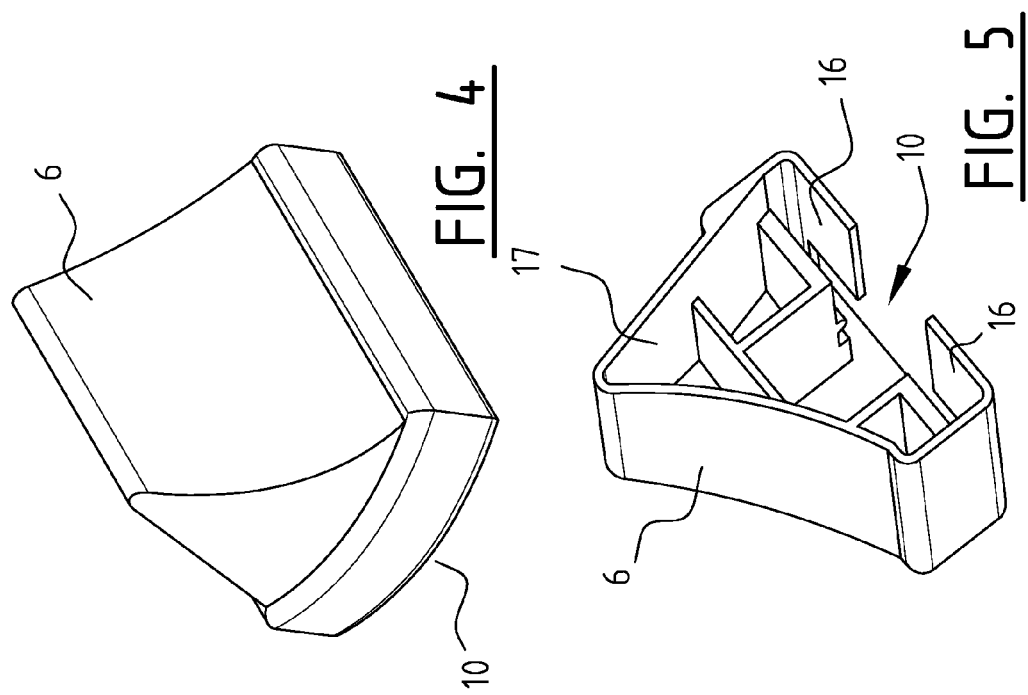

WINDSCREEN WIPER DEVICE

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating wiper arm.

Such a windscreen wiper device is generally known. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. The oscillating arm of the prior art windscreen wiper device comprises a projecting pin on one side thereof, which is inserted sideways into a through hole of the connecting device.

One drawback of the prior art windscreen wiper device is that in case the elongated wiper blade of a flexible material (being an elastomeric material, such as rubber) needs to be replaced due to wear and/or ageing, the structure composed of said wiper blade, said longitudinal strips, said connecting pieces (in practice also called "end caps"), as well as said connecting device for the oscillating arm, needs to be replaced in its entirety. In other words, replacement of said wiper blade necessarily results in replacement of the entire structure, as indicated above, with all negative consequences involved, both from an economical and a environmental point of view. I note that particularly in countries having a rainy climate, where the windscreen wiper device will by definition be used more frequently than in countries that have a lot of sunshine, the above drawback forms a heavy financial burden on a driver of for example a car.

The object of the invention is to overcome the drawback of the prior art as indicated above and in order to accomplish that objective, a windscreen wiper device of the kind referred to in the introduction is characterized in that said wiper blade is detachably connected to said longitudinal strips, wherein said wiper blade can freely slide along said longitudinal strips between a first position, wherein said wiper blade is retained onto said longitudinal strips, and a second position, wherein said wiper blade is disconnected from said longitudinal strips in order to be replaced or repaired. In other words, in the first position said wiper blade is only supported by said longitudinal strips (in practice also called "flexors", "vertebra" or "backing strips") making it possible to slidably connect or disconnect said wiper blade to or from the longitudinal strips. Removing said wiper blade from said longitudinal strips for replacement or repair leaves the structure composed of said longitudinal strips, said connecting pieces, as well as said connecting device for the oscillating arm undisturbed in the sense that said structure does not need to be disconnected from the oscillating arm in order to be replaced as well. Therefore, replacement of said wiper blade does not necessarily imply replacement of said entire structure.

It is noted that the invention is not restricted to use with passenger cars, but it can also be used with trains and other fast vehicles.

In one preferred embodiment of a windscreen wiper device in accordance with the invention, at least one of said longitudinal strips comprises a recess at the location of its interior longitudinal edge, wherein said wiper blade can be slidably connected to or disconnected from said longitudinal strips through said recess. Said recess forms an entrance through which said wiper blade as a separate construction element can be slided by hand along said longitudinal strips until said wiper blade is finally retained onto said longitudinal strips (the first position). Said recess also acts as an exit through which said wiper blade can be slided by hand from the first position until said wiper blade as a separate "loose" construction element can be replaced or repaired (the second position). Particularly, each longitudinal strip comprises a recess at the location of its interior longitudinal edge so that opposing recesses form an aperture, wherein said wiper blade can be slidably connected to or disconnected from said longitudinal strips through said aperture.

In another preferred embodiment of a windscreen wiper device according to the invention, at least one connecting piece comprises engaging members engaging around the longitudinal strips so that said strips are mounted in grooves formed by said engaging members, wherein said strips and said connecting piece are slidably connected by means of a snap connection, and wherein in the first position of said wiper blade a free end of said wiper blade is adjacent to a stop surface of said connecting piece. By sliding said connecting piece over the neighbouring ends of said strips—or vice versa, that is by sliding the neighbouring ends of said strips into said connecting piece—a reliable snap connection between these parts is realized. The snap connection particularly comprises a hole or an aperture and a protrusion cooperating together. In the first position the free end of said wiper blade may abut said stop surface of said connecting piece.

In another preferred embodiment of a windscreen wiper device in accordance with the invention, the snap connection comprises laterally extending means on said strips. Preferably, said laterally extending means comprise at least one protrusion extending laterally from a longitudinal edge of each strip, said protrusion being located between stops on the connecting piece. In another preferred version, said laterally extending means comprise at least two stops extending laterally from a longitudinal edge of each strip, said stops being located on opposite sides of a protrusion on the connecting piece.

In another preferred embodiment of a windscreen wiper device according to the invention, said laterally extending means extend laterally from the interior longitudinal edge of each strip. In the alternative, said laterally extending means extend laterally from the exterior longitudinal edge of each strip.

In another preferred embodiment of a windscreen wiper device in accordance with the invention, the engaging members are integral with said connecting piece. The connecting piece is particularly made in one piece of plastic.

In another preferred embodiment of a windscreen wiper device according to the invention, a spoiler is provided, wherein said spoiler is retained onto said longitudinal strips. The spoiler is preferably a separate constructional element being entirely detachably connected to the longitudinal strips, wherein the connecting piece can be slided over a spoiler end. Said spoiler particularly comprises engaging members engaging around the longitudinal strips, so that said strips are mounted in grooves formed by said engaging members. More in particular, the engaging members of said spoiler are integral with said spoiler.

In another preferred embodiment of a windscreen wiper device in accordance with the invention, said connecting device comprises engaging members engaging around the longitudinal strips so that said strips are mounted in grooves formed by said engaging members. Preferably, the engaging members of said connecting device are integral with said connecting device.

The invention will now be explained in more detail with reference to figures illustrated in a drawing, wherein:

FIGS. 2 through 6 show details of the windscreen wiper device of FIG. 1; and

Figure 1:
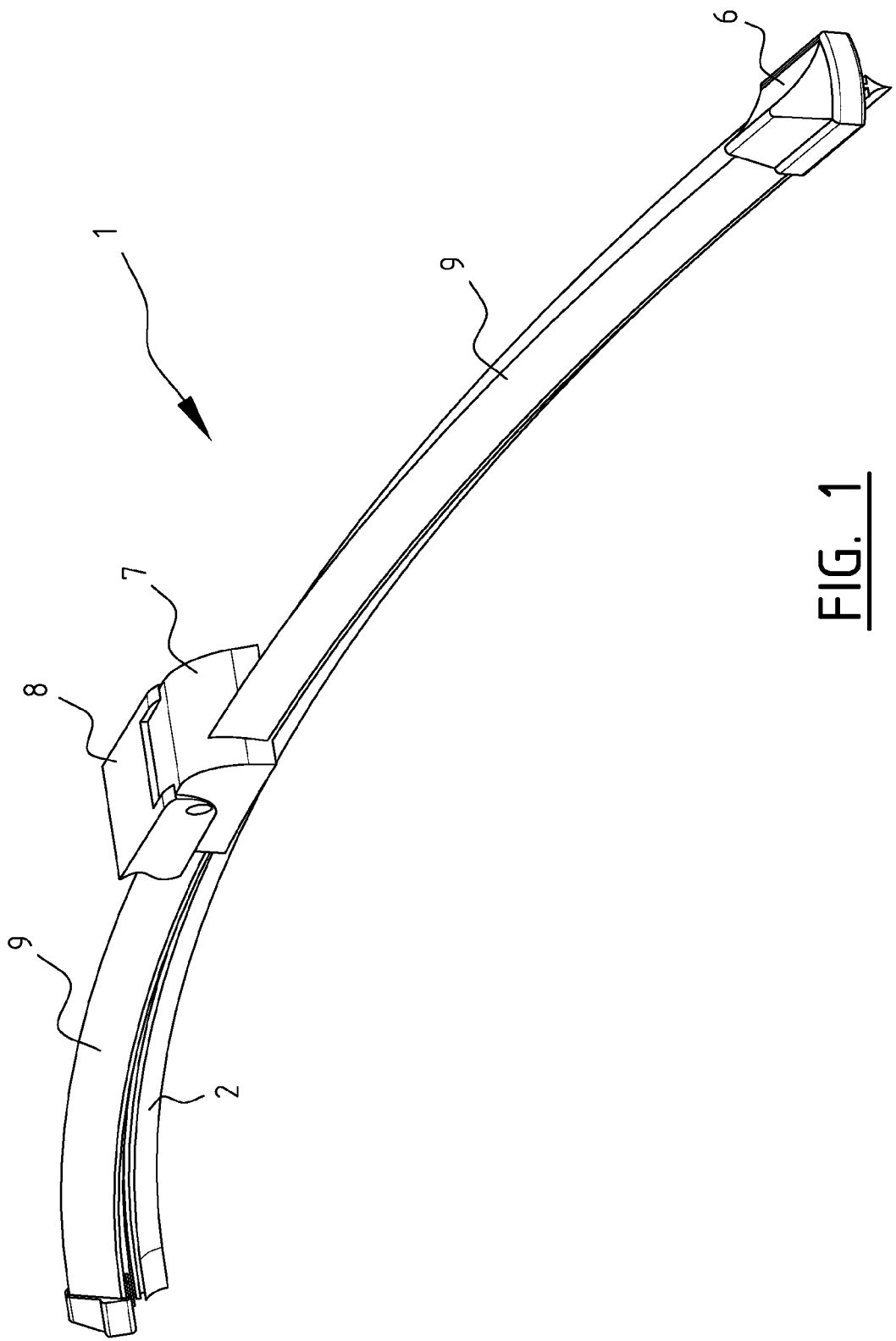
FIG. 1 is a perspective, schematic view of a preferred embodiment of a windscreen wiper device according to the invention.

FIG. 1 shows a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6. The windscreen wiper device 1 is further equipped with a connecting device 7 for an oscillating arm 8, and a spoiler 9.

FIG. 2 shows a free end of the windscreen wiper device 1 of FIG. 1, whereas FIG. 3 reveals a bottom view of said free end without the wiper blade 2 being present. Corresponding parts have been designated with the same reference numerals. As can be seen from FIGS. 2, 4 and 5 (the latter two figures showing in perspective the connecting piece 6 as a separate constructional element), the connecting piece 6 is provided with a stop surface 10 in order to block a relative movement of the wiper blade 2 along the strips 4 inside the connecting piece 6 during use. The connecting pieces 6 are made of one piece of plastic.

With reference to FIG. 6 relating to a top view of the strips 4 as such, said strips 4 are each provided with a protrusion 11 extending laterally from a longitudinal interior edge 12 of the strips 4. When a connecting piece 6 is slidably mounted onto the neighboring ends 5 of the strips 4, a snap or clicking connection is realized, wherein the protrusions 11 are snapped or clicked between stops 13 ("notches 13") inside the connecting piece 6. Each protrusion 11 rests in a small groove 14 between these opposing stops 13. Accordingly, the strips 4 are blocked against any movement in longitudinal direction with respect to the connecting pieces 6. Each connecting piece 6 is also provided with two engaging members 15 made integral therewith, wherein said engaging members 15 engage around the strips 4 so as to form a groove 16 for sliding the strips 4 therein. Said engaging members 15 ensure that the strips 4 are blocked against any movement in transversal direction with respect to the connecting pieces 6.

The stop 13 facing away from the free end of the connecting piece 6 is equipped with an inclined upper surface, so that sliding said connecting piece 6 onto the strips 4 does not take too much force, whereas once the protrusion 11 rests inside said groove 14 dismounting the connecting piece 6 from the strips 4 cannot take place easily. The stop 13 facing towards the free end of the connecting piece 6 also ensures that the strips are kept at a mutual constant distance, as the upper end of each strip 4 is located between said stop 13 and a (side) wall of the connecting piece 6.

Figure 7:
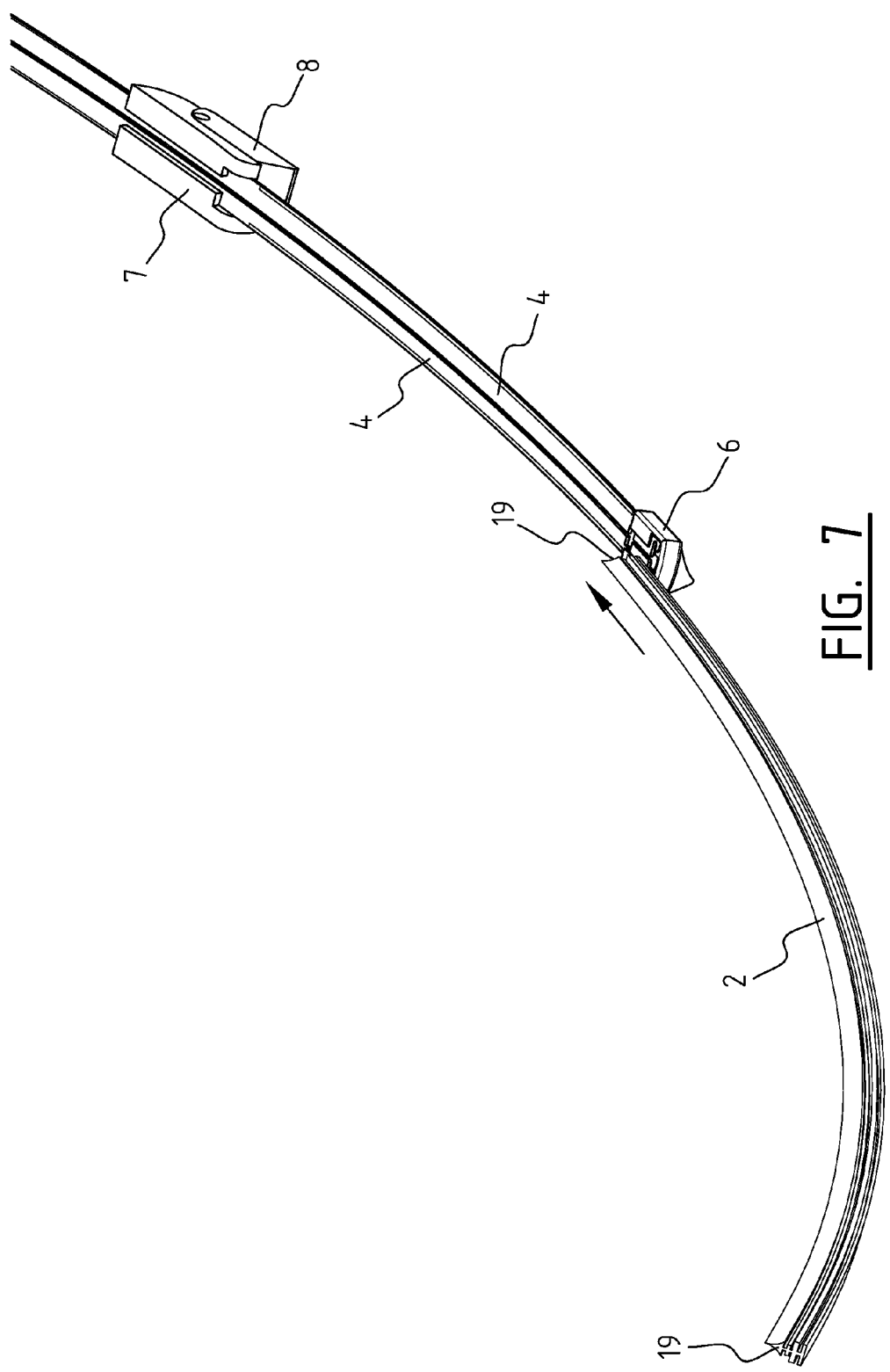
FIGS. 7 and 8 show the steps to connect and to disconnect a rubber wiper blade of a windscreen wiper device of FIG. 1 to or from longitudinal strips of such a windscreen wiper device.
Figure 8A:
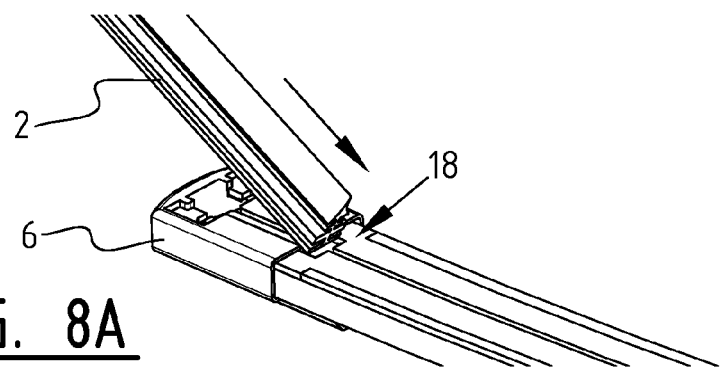
Figure 8B:
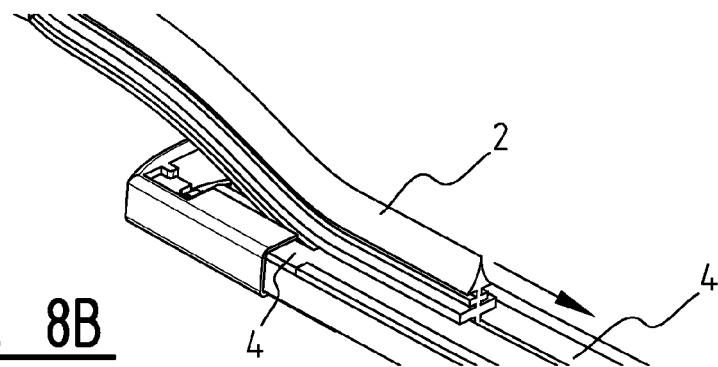
Figure 8C:
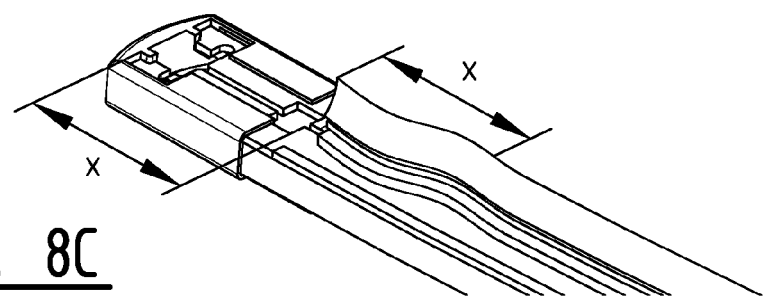
Figure 8D:
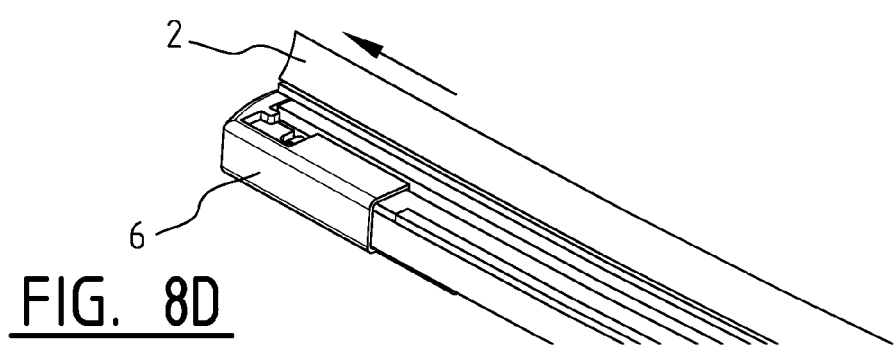

With reference to FIGS. 7 and 8 showing a bottom view of a part of the windscreen wiper device of FIG. 1, each strip 4 comprises a recess 17 at the location of its interior longitudinal edge 12, so that opposing recesses 17 form an aperture or opening 18. Said wiper blade 2 can be slidably connected to or disconnected from said strips 4 through said aperture 18. Thus, the aperture 18 acts as an entrance opening through which said wiper blade 2 as a separate construction element can be slided by hand along said strips 4 until said wiper blade 2 is finally retained onto said strips 4 (first position). In that first (working) position said wiper blade 2 is only supported by the strips 4, wherein free ends 19 of said wiper blade 2 abut the stop surfaces 10 of the connecting pieces 6. Said aperture 18 also acts as an exit opening through which said wiper blade 2 can be slided by hand from the first position until said wiper blade as a separate "loose" construction element can be replaced or repaired (the second position).

The present invention is not limited to the embodiment shown, but extends also to other embodiments falling within the scope of the appended claims. For example, a skilled person would easily understand without inventive skill that said longitudinal strips 4 (called "flexors" in practice) may be made in one piece, so that an integral flexor is formed, and that said connecting pieces 6 can be made of any suitable material (whether or not in one piece).

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece constructed as a separate component from said carrier element, which windscreen wiper device comprises a connecting device for an oscillating wiper arm, wherein said wiper blade is detachably connected to said longitudinal strips, wherein at least one of said longitudinal strips comprises a recess at the location of its interior longitudinal edge, and wherein said wiper blade can be slidably connected to or disconnected from said longitudinal strips through said recess wherein said wiper blade can freely slide along said longitudinal strips between a first position, wherein said wiper blade is retained onto said longitudinal strips, and a second position, wherein said wiper blade is disconnected from said longitudinal strips in order to be replaced or repaired, and wherein said connecting pieces and said strips are slidably connected by a snap connection in a way that supports and maintains the strips sufficiently apart so that the wiper blade can slide longitudinally relative to the strips, and said connecting pieces are provided with a stop surface in order to block a relative movement of the wiper blade along the strips inside said connecting pieces during use, said stop surface forming an end wall of said connecting pieces.

2. A windscreen wiper device according to claim 1, wherein said recesses of said longitudinal strips form an aperture, and wherein said wiper blade can be slidably connected to or disconnected from said longitudinal strips through said aperture.

3. A windscreen wiper device according to claim 1, wherein at least one connecting piece comprises engaging members engaging around said longitudinal strips so that said longitudinal strips are mounted in grooves formed by said engaging members, and wherein in the first position of said wiper blade a free end of said wiper blade is adjacent to said stop surface of said connecting piece.

4. A windscreen wiper device according to claim 3, wherein the snap connection comprises laterally extending means on said longitudinal strips.

5. A windscreen wiper device according to claim 4, wherein said laterally extending means comprise at least one protrusion extending laterally from a longitudinal edge of each longitudinal strip, said protrusion being located between stops on said connecting piece.

6. A windscreen wiper device according to claim 4, wherein said laterally extending means comprise at least two stops extending laterally from a longitudinal edge of each longitudinal strip, said stops being located on opposite sides of a protrusion on said connecting piece.

7. A windscreen wiper device according to claim 4, wherein said laterally extending means extend laterally from the interior longitudinal edge of each longitudinal strip.

8. A windscreen wiper device according to claim 3, wherein said engaging members are integral with said connecting piece.

9. A windscreen wiper device according to claim 1, wherein a spoiler is provided, and wherein said spoiler is retained onto said longitudinal strips.

10. A windscreen wiper device according to claim 9, wherein said spoiler comprises engaging members engaging around the longitudinal strips so that said strips are mounted in grooves formed by said engaging members.

11. A windscreen wiper device according to claim 10, wherein the engaging members of said spoiler are integral with said spoiler.

12. A windscreen wiper device according to claim 1, wherein said connecting device comprises engaging members engaging around the longitudinal strips so that said strips are mounted in grooves formed by said engaging members.

13. A windscreen wiper device according to claim 12, wherein said engaging members of said connecting device are integral with said connecting device.

* * * * *